US012768803B2

(12) United States Patent
Huang et al.

(10) Patent No.: US 12,768,803 B2
(45) Date of Patent: Oct. 20, 2026

(54) CONVEYING SYSTEM FOR INSPECTION DEVICE

(71) Applicant: NUCTECH COMPANY LIMITED, Beijing (CN)

(72) Inventors: Qingping Huang, Beijing (CN); Mingzhi Hong, Beijing (CN); Jianxue Yang, Beijing (CN); Guipei Li, Beijing (CN); Liguo Zhang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 230 days.

(21) Appl. No.: 18/699,389

(22) PCT Filed: Sep. 29, 2022

(86) PCT No.: PCT/CN2022/122501
§ 371 (c)(1),
(2) Date: Apr. 8, 2024

(87) PCT Pub. No.: WO2023/056883
PCT Pub. Date: Apr. 13, 2023

(65) Prior Publication Data

US 2025/0237617 A1 Jul. 24, 2025

(30) Foreign Application Priority Data

Oct. 8, 2021 (CN) .......................... 202111172981.4

(51) Int. Cl.
*G01N 23/046* (2018.01)
*G01N 23/083* (2018.01)

(52) U.S. Cl.
CPC ......... *G01N 23/046* (2013.01); *G01N 23/083* (2013.01); *G01N 2223/321* (2013.01)

(58) Field of Classification Search
CPC .... G01N 23/083; G01N 23/046; G01N 23/04; G01N 2223/321; G01N 23/18;
(Continued)

(56) References Cited

U.S. PATENT DOCUMENTS

| | | | | |
|---|---|---|---|---|
| 6,542,580 B1 * | 4/2003 | Carver | G01N 23/04 | 378/57 |
| 7,050,536 B1 * | 5/2006 | Fenkart | G01V 5/22 | 378/68 |

(Continued)

FOREIGN PATENT DOCUMENTS

| | | |
|---|---|---|
| AT | 513660 A1 | 6/2014 |
| CN | 101738405 A | 6/2010 |

(Continued)

OTHER PUBLICATIONS

International Search Report and Written Opinion mailed on Dec. 21, 2022 for International Patent Application PCT/CN2022/122501 (12 pages including English Translation of Search Report).

(Continued)

*Primary Examiner* — Irakli Kiknadze
(74) *Attorney, Agent, or Firm* — Merchant & Gould P.C.

(57) ABSTRACT

A conveying system for an inspection device, including an imaging system, used to scan and inspect an object; a first transmission mechanism configured to convey the object to the imaging system; and a supporting structure intersecting an inspection surface of the imaging system, where the object is pushed to slide along the supporting structure and passes through the imaging system. The first transmission mechanism includes: a chassis; a driving device; a lead screw driven by the driving device; a first slide rail, where an extension direction of the first slide rail is parallel to an extension direction of the lead screw; and a sliding mechanism connected to the lead screw, where the lead screw may drive the sliding mechanism to move along the extension (Continued)

direction of the lead screw, so that the sliding mechanism pushes the object to slide on the first slide rail and the supporting structure.

11 Claims, 7 Drawing Sheets

(58) Field of Classification Search
CPC ......... G01N 2223/40; G01N 2223/652; G01N 2223/32; G01N 2223/304; G01N 2223/33; G01N 2223/5015; G01N 2223/04; G01N 2223/50; G01N 2223/643; G01N 23/10; G01N 23/20008; G01N 23/203; G01N 2223/053; G01N 2223/055; G01N 2223/1013; G01N 2223/1016; G01N 2223/1066; G01N 2223/301; G01N 2223/316; G01N 2223/3301; G01N 2223/41; G01N 2223/501; G01N 2223/5055; G01N 2223/639; G01N 23/087; G01N 33/12; G01N 2223/423; G01N 2223/424; G01N 2223/401; G01N 23/043; G01V 5/226; G01V 5/00; G01V 5/22; G01V 5/232; G01V 5/20; G01V 5/224; G01V 5/222; B65G 25/10; B65G 47/82; B65G 49/00; G06V 10/764; G06V 10/806; G06N 3/0464; G06N 3/045; G06N 3/0442; G06T 5/94; G06T 7/0004; G06T 2207/20084; G06T 2207/30141; G06T 2207/30004; G06T 2207/20216; G06T 2207/20182; G06T 2207/30196; G06T 2207/10116; A61B 34/00; A61B 34/35; A61B 17/34; A61B 6/588; A61B 6/589; A61B 6/4452; A61B 6/587; A61B 6/4258; A61B 6/037; A61B 2562/0238; A61B 2562/0242; G01T 1/36; G01T 1/2985; G01T 1/00; G01T 7/00; G01T 1/2006; G01T 1/2008; G01T 1/201; G01T 1/20181; G01T 1/20185; G01T 1/203; G01T 3/06; G01T 5/08; G01T 7/08; G21F 3/00; H10F 39/1898; B07C 5/3416; B07C 5/346; H05K 13/082
USPC ............................................ 378/62, 68, 208
See application file for complete search history.

(56) References Cited

U.S. PATENT DOCUMENTS

| | | | | |
|---|---|---|---|---|
| 2005/0117700 | A1* | 6/2005 | Peschmann | G01V 5/00 378/57 |
| 2013/0077760 | A1 | 3/2013 | Tagawa | |
| 2019/0297759 | A1 | 9/2019 | Degura | |
| 2020/0010287 | A1 | 1/2020 | Urata et al. | |
| 2020/0184619 | A1* | 6/2020 | Takata | G06Q 50/04 |
| 2021/0002078 | A1* | 1/2021 | MacDonald | B65G 15/44 |
| 2023/0080948 | A1* | 3/2023 | Takayama | G01N 23/10 378/57 |

FOREIGN PATENT DOCUMENTS

| | | | |
|---|---|---|---|
| CN | 108002055 | A | 5/2018 |
| CN | 208297393 | U | 12/2018 |
| CN | 209382842 | U | 9/2019 |
| CN | 209632693 | U | 11/2019 |
| CN | 209651349 | U | 11/2019 |
| CN | 210557416 | U | 5/2020 |
| CN | 112945966 | A | 6/2021 |
| EP | 1097387 | B1 | 2/2003 |
| JP | 2015200528 | A | 11/2015 |
| JP | 2016200543 | A | 12/2016 |

OTHER PUBLICATIONS

First Office Action issued on Oct. 23, 2023 for Chinese Office Action 202111172981.4 (19 pages including English Translation).
Second Office Action issued on Dec. 29, 2023 for Chinese Office Action 202111172981.4 (22 pages including English Translation).
Third Office Action issued on Mar. 15, 2024 for Chinese Office Action 202111172981.4 (22 pages including English Translation).
First Office Action dated Apr. 4, 2025 for corresponding Germany Application No. 112022003977.9 (10 pgs including English Translation).

* cited by examiner

CONVEYING SYSTEM FOR INSPECTION DEVICE

CROSS-REFERENCE TO RELATED APPLICATIONS

This application is a Section 371 National Stage Application of International Application No. PCT/CN2022/122501, filed on Sep. 29, 2022, and which claims priority to Chinese Patent Application No. 202111172981.4 filed on Oct. 8, 2021, and the contents of which are incorporated herein by reference in their entireties.

TECHNICAL FIELD

The present disclosure relates to a field of security inspection technology, and in particular, to a conveying system for an inspection device.

BACKGROUND

At present, due to insufficient positioning accuracy of the conveying system of the inspection device, an object to be inspected may not be accurately positioned on a ray main beam surface of an imaging system of the inspection device. Especially for the inspection of some ultra-thin layers, if the positioning is not accurate, the obtained inspection image is difficult to meet the requirements for the quality of the ultra-thin layer image inspection.

SUMMARY

In an aspect, a conveying system for an inspection device is provided, including:

an imaging system configured to scan and inspect an object to be inspected;

a first transmission mechanism disposed on an entrance side of the imaging system, and configured to convey the object to be inspected to the imaging system; and a supporting structure intersecting an inspection surface of the imaging system, where the first transmission mechanism pushes the object to be inspected to slide along the supporting structure and passes through the imaging system;

wherein the first transmission mechanism includes:

a chassis;

a driving device fixed on the chassis;

a lead screw connected to the driving device, and driven by the driving device;

a first slide rail fixed on the chassis, where an extension direction of the first slide rail is parallel to an extension direction of the lead screw;

a sliding mechanism connected to the lead screw, where the lead screw drives the sliding mechanism to move, so that the sliding mechanism pushes the object to be inspected to slide on the first slide rail and the supporting structure.

According to an embodiment of the present disclosure, a second slide rail is further included. The second slide rail is fixed on the chassis. The second slide rail is configured to support the sliding mechanism. The lead screw may drive the sliding mechanism to slide on the second slide rail.

According to an embodiment of the present disclosure, the driving device includes a servo motor. One end of the lead screw is connected to an output end of the servo motor, and the other end of the lead screw is connected to the chassis.

According to an embodiment of the present disclosure, the sliding mechanism is provided with at least one push component. The push component may move with the sliding mechanism and be configured to push the object to be inspected to move on the first slide rail.

The push component includes:

a lever disposed on the sliding mechanism;

a knob rotatably disposed on the lever with a Z-axis as a rotating axis, where under a driving of the sliding mechanism, the knob may abut onto the object to be inspected to drive the object to be inspected to move.

According to an embodiment of the present disclosure, at least one knob is rotatably arranged on the lever and is configured as an eccentric structure.

The knob has a first position at which the knob protrudes from a carrying surface under a driving of an eccentric force and a second position at which the knob flips below the carrying surface under an action of an external force. The carrying surface is configured to place the object to be inspected.

When the sliding mechanism moves in an X direction, the knob is configured to push the object to be inspected to move in the X direction with the knob being at the first position.

According to an embodiment of the present disclosure, the knob has:

a push surface applicable to abut onto the object to be inspected;

a guide surface disposed at an angle with the push surface, and applicable to accept the external force;

a limiting structure configured to limit a rotation of the knob when the knob moves to the first position.

When the sliding mechanism moves in a negative direction of the X-axis, the guide surface collides with the object to be inspected to drive the knob to move to the second position.

According to an embodiment of the present disclosure, further including:

a counterweight block disposed on the knob to adjust an eccentricity of the knob, so that the knob automatically resets to the first position, and the push surface is perpendicular to a YZ plane at the first position.

According to an embodiment of the present disclosure, the knob is rotatably disposed at one end of the sliding mechanism away from the push component, and the knob away from the push component is spaced apart from the knob of the push component in the X direction.

According to an embodiment of the present disclosure, a second transmission mechanism is further included. The second transmission mechanism is disposed on an exit side of the imaging system, and the second transmission mechanism is configured to convey the object to be inspected from the supporting structure.

According to an embodiment of the present disclosure, a conveying method of the second transmission mechanism includes an unpowered conveying.

According to an embodiment of the present disclosure, the conveying method of the second transmission mechanism includes a belt conveyer conveying, a power roller conveying, a synchronous belt conveying, or a lead screw conveying.

According to an embodiment of the present disclosure, the imaging system includes a CT imaging system or a DR imaging system.

According to an embodiment of the present disclosure, protective covers are provided on both the entrance side and the exit side of the imaging system. The protective covers are configured to shield a radiation ray of the imaging system.

In another aspect, a conveying system for an inspection device is provided, including:

- an imaging system configured to scan and inspect an object to be inspected;
- a first transmission mechanism disposed on an entrance side of the imaging system, and configured to convey the object to be inspected to the imaging system; and
- a supporting structure intersecting an inspection surface of the imaging system, where the first transmission mechanism may push the object to be inspected to slide along the supporting structure and pass through the imaging system.

The first transmission mechanism includes:

- a chassis;
- a driving device fixed on the chassis;
- a synchronous belt driven by the driving device;
- a first slide rail fixed on the chassis, where the first slide rail is configured to support the object to be inspected and convey the object to be inspected to the supporting structure;
- a sliding mechanism, where the synchronous belt may drive the sliding mechanism to move, so that the sliding mechanism may push the object to be inspected to slide on the first slide rail and the supporting structure.

BRIEF DESCRIPTION OF THE DRAWINGS

With reference to the accompanying drawings in the following text, the other purposes and advantages of the present disclosure will be apparent and may help to have a comprehensive understanding of the present disclosure.

Figure 1:
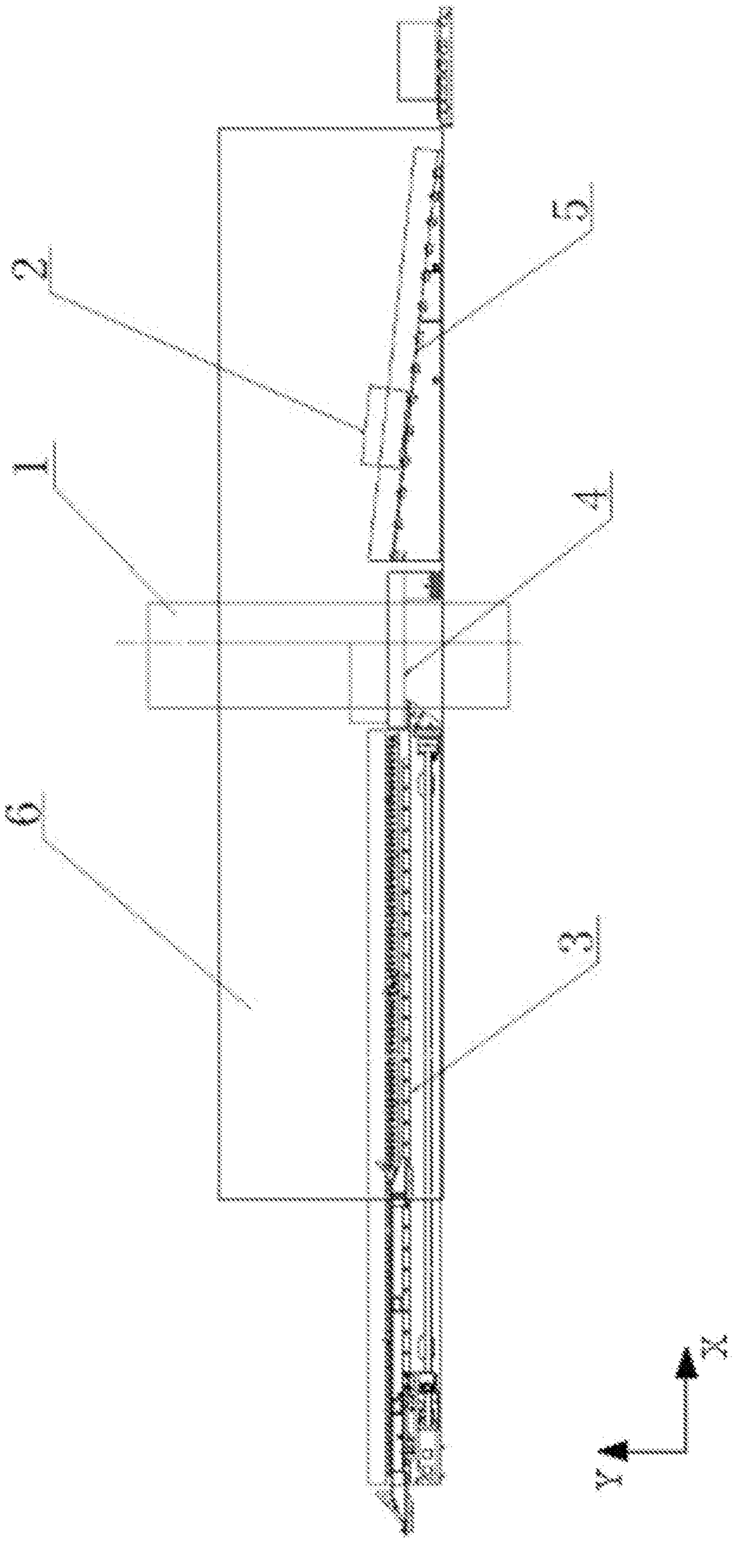
FIG. 1 is a schematic diagram of an entire structure of a conveying system for an inspection device according to an embodiment of the present disclosure.

In the figures, 1. Imaging system; 11. Inspection surface; 2. Object to be inspected; 3. First transmission mechanism; 31. Chassis; 32. Driving device; 33. Lead screw; 34. Sliding mechanism; 35. First slide rail; 36. Push component; 361. lever; 362. Knob; 3621. Push surface; 3622. Guide surface; 3623. Limiting structure; 3624. Counterweight block; 37. Second slide rail; 38. Slide rail groove; 4. Supporting structure; 5. Second transmission mechanism; 6. Protective cover.

It should be noted that for clarity, in the drawings used to describe the embodiments of the present disclosure, the size of the structure or region may be enlarged or reduced, meaning that these drawings are not drawn to actual proportions.

DETAILED DESCRIPTION OF EMBODIMENTS

For clarity of the objectives, technical solutions and advantages of the embodiments of the present disclosure clearer, the technical solutions in the embodiments of the present disclosure will be described clearly and completely in combination with the accompanying drawings of the embodiments of the present disclosure. Obviously, the described embodiments are only part of the embodiments of the present disclosure, not all of them. Based on the embodiments of the present disclosure provided, all other embodiments obtained by those of ordinary skill in the art without creative labor fall within the scope of protection of the present disclosure.

Unless otherwise defined, the technical or scientific terms used herein shall have general meanings understood by those of ordinary skill in the art. The terms "first", "second", and the like used herein do not indicate any order, quantity, or importance, but are only for distinguishing different components. The term "comprise", "include", or the like means that a component or object before this term, covers a component or object listed after this term and its equivalents, rather than excluding other components or objects.

Herein, unless otherwise specified, directional terms such as "upper", "lower", "left", "right", "inside", "outside" may be used to represent orientation or positional relationships based on the drawings, only for the purpose of describing the present disclosure, rather than indicating or implying that the device, element or component referred to must have a specific orientation, be constructed or operated in a specific orientation. It will be understood that when the absolute position of the described object changes, the relative positional relationship they represent may also change accordingly. Therefore, these directional terms may not be understood as restrictions on the present disclosure.

An embodiment of the present disclosure provides a conveying system for an inspection device, including: an imaging system 1, which is used to scan and inspect an object to be inspected 2; a first transmission mechanism 3 disposed on an entrance side of the imaging system 1, and used to convey the object to be inspected 2 to the imaging system 1; and a supporting structure 4, which intersects an inspection surface 11 of the imaging system 1. The first transmission mechanism 3 may push the object to be inspected 2 to slide along the supporting structure 4 and pass through the imaging system 1. The first transmission mechanism 3 includes: a chassis 31; a driving device 32, which is fixed to the chassis 31; a lead screw 33, which is connected to the driving device 32, and may be driven by the driving device 32; a first slide rail 35, which is fixed on the chassis 31, where an extension direction of the first slide rail 35 is parallel to an extension direction of the lead screw 33; a sliding mechanism 34, which is connected to the lead screw 33, and the lead screw 33 may drive the sliding mechanism 34 to move, so that the sliding mechanism 34 may push the object to be inspected 2 to slide on the first slide rail 35 and the supporting structure 4. Through the above structural design and using the lead screw 33 for transmission, the object to be inspected 2 may be accurately positioned on an inspection surface 11 of the imaging system 1 of the inspection device, effectively solving the problem of insufficient positioning accuracy of the conveying system of the inspection device, and meeting the requirements of certain products for image inspection quality.

Another embodiment of the present disclosure also provides a conveying system for an inspection device, including: an imaging system 1, which is used to scan and inspect an object to be inspected 2; a first transmission mechanism 3 disposed on an entrance side of the imaging system 1, and used to convey the object to be inspected 2 to the imaging system 1; and a supporting structure 4, which intersects an inspection surface 11 of the imaging system 1, where the first transmission mechanism 3 may push the object to be inspected 2 to slide along the supporting structure 4 and pass through the imaging system 1. The first transmission mechanism 3 includes: a chassis 31; a driving device 32, which is fixed to chassis 31; a synchronous belt, which is connected to the driving device 32 and may be driven by the driving device 32; a first slide rail 35, which is fixed on the chassis 31, where the end of the first slide rail 35 is matched with and connected to the supporting structure 4, and the first slide rail 35 is used to support the object to be inspected 2 and convey the object to be inspected 2 to the supporting structure 4; a sliding mechanism 34, where the synchronous belt may drive the sliding mechanism 34 to move, so that the sliding mechanism 34 may push the object to be inspected 2 to slide on the first slide rail 35 and the supporting structure 4. Through the above structural design, the synchronous belt may be used to provide power for the sliding mechanism 34. When the sliding mechanism 34 moves with the synchronous belt, the sliding mechanism 34 may push the object to be inspected 2 to move, that is, the sliding mechanism 34 may continuously convey the object to be inspected 2 through the inspection of the imaging system 1.

Figure 2:
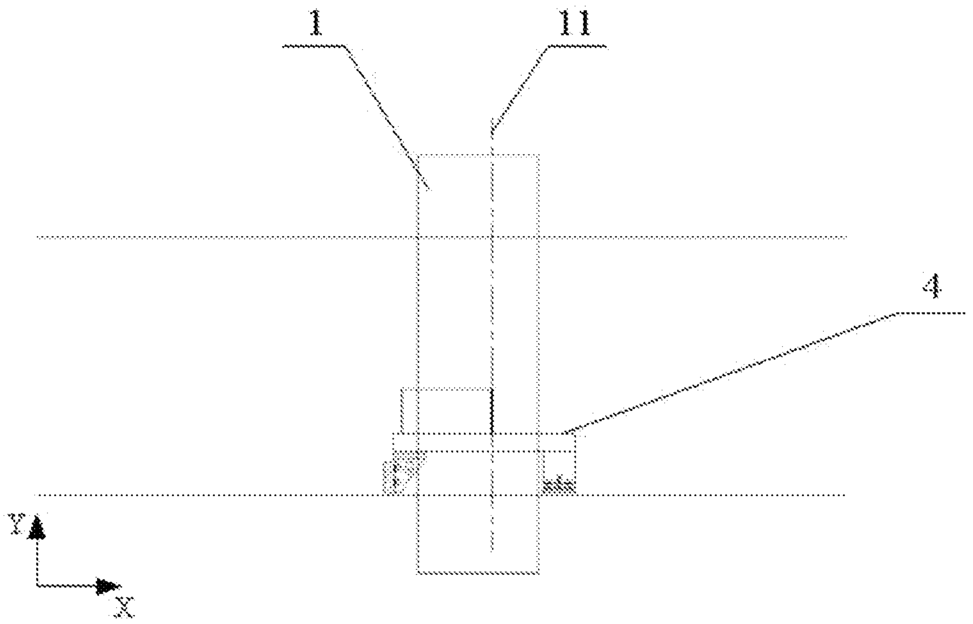
FIG. 2 is a partially enlarged view of FIG. 1, in which schematic diagrams of an imaging system and a supporting structure are shown.
Figure 3:
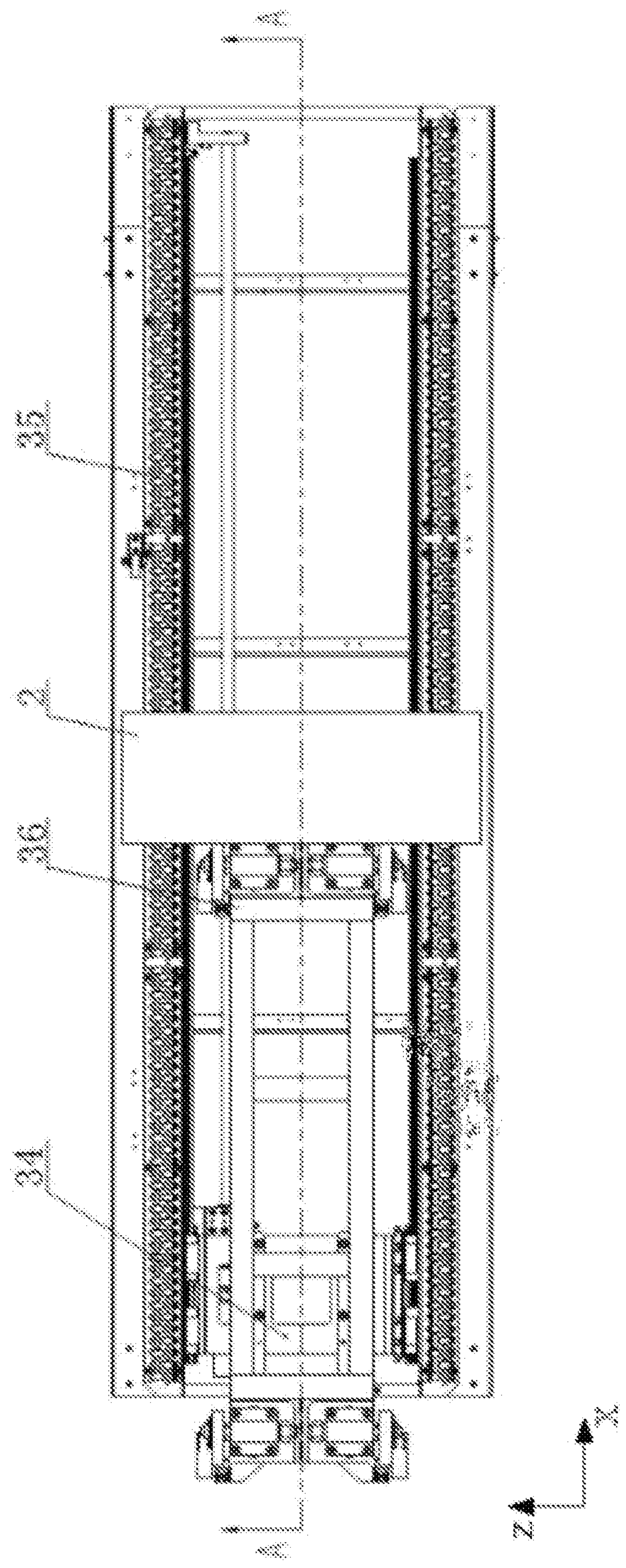
FIG. 3 is a top view of a first transmission mechanism included in a conveying system for an inspection device according to an embodiment of the present disclosure.
Figure 4:
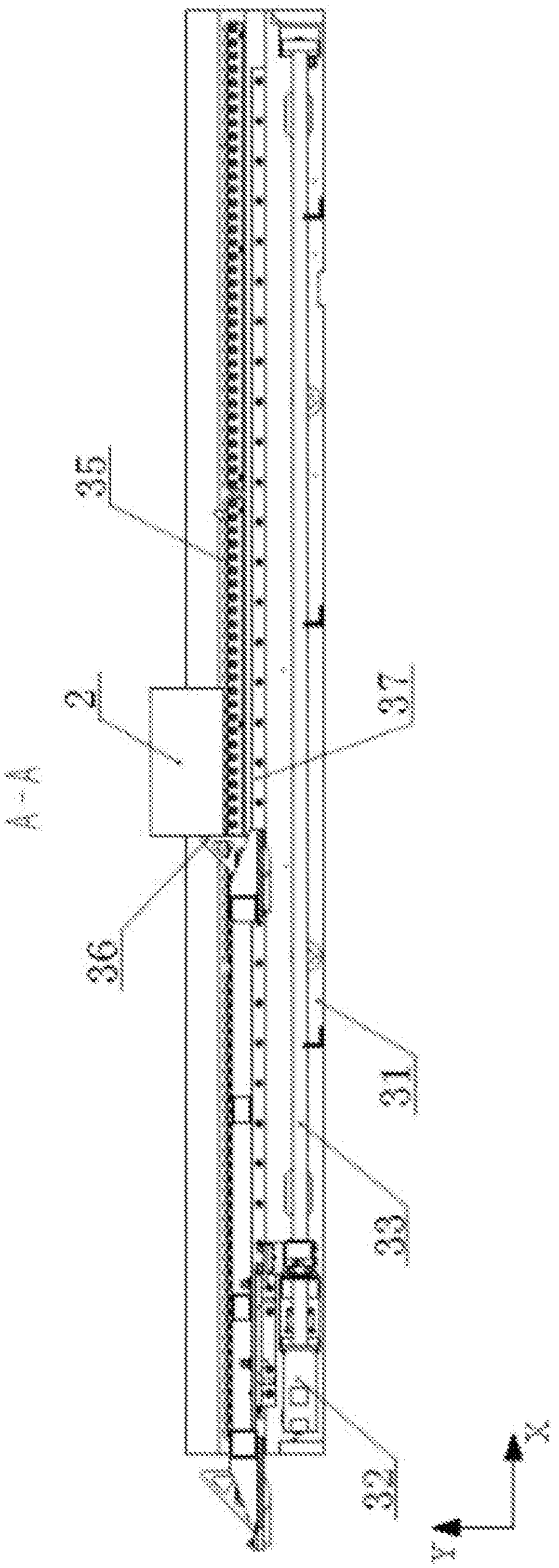
FIG. 4 is a cross-sectional view at an A-A plane shown in FIG. 3.
Figure 5:
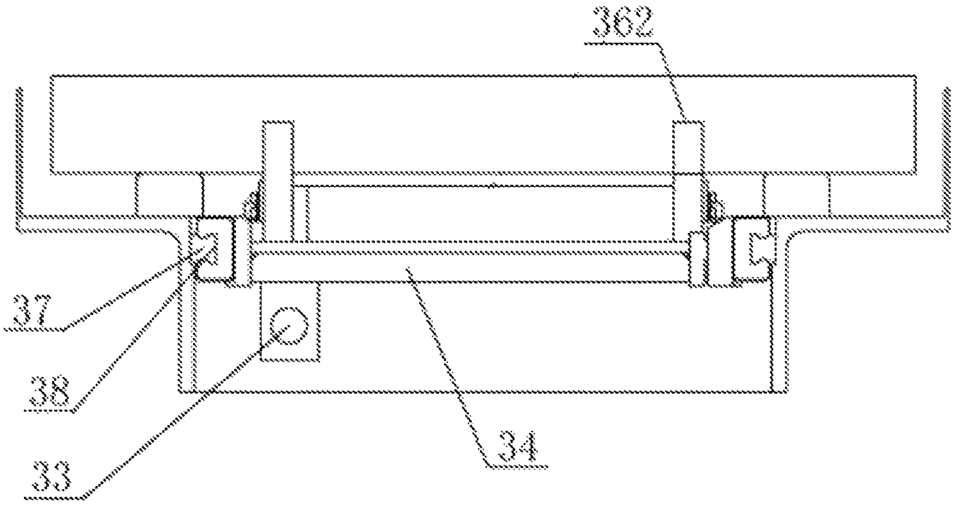
FIG. 5 is a side view of a first transmission mechanism included in a conveying system for an inspection device according to an embodiment of the present disclosure.
Figure 6:
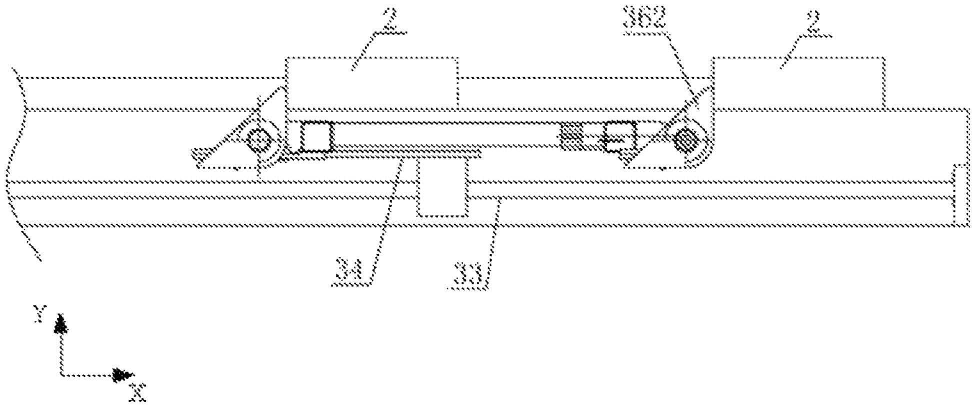
FIG. 6 is an enlarged view of a sliding mechanism included in a conveying system for an inspection device according to an embodiment of the present disclosure.
Figure 7:
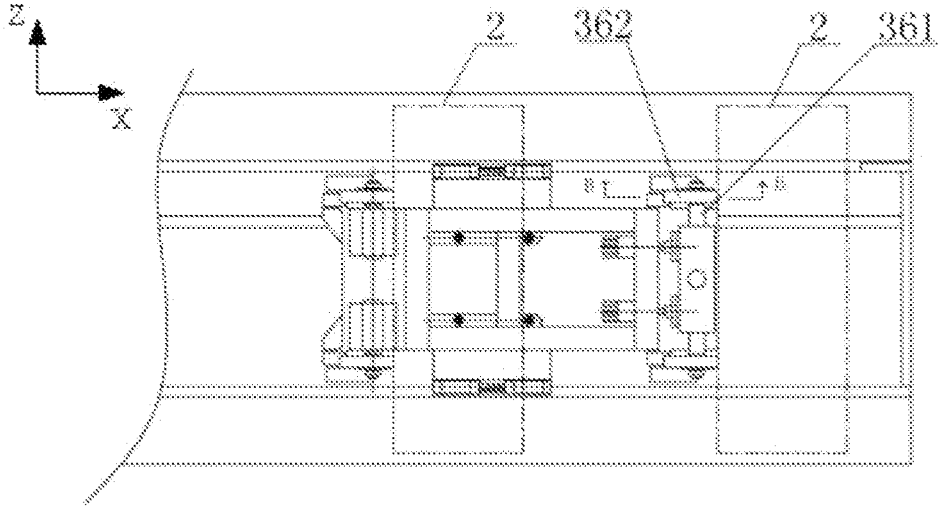
FIG. 7 schematically shows a top view of a sliding mechanism according to an embodiment of the present disclosure.
Figure 8:
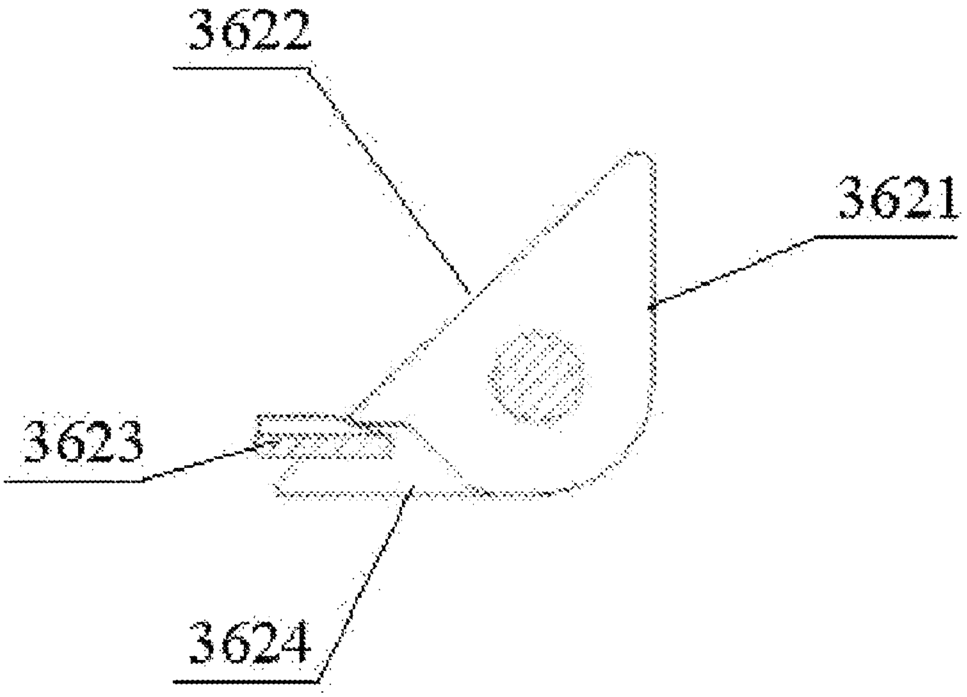
FIG. 8 schematically shows a cross-sectional view at B-B in FIG. 7.
Figure 9:
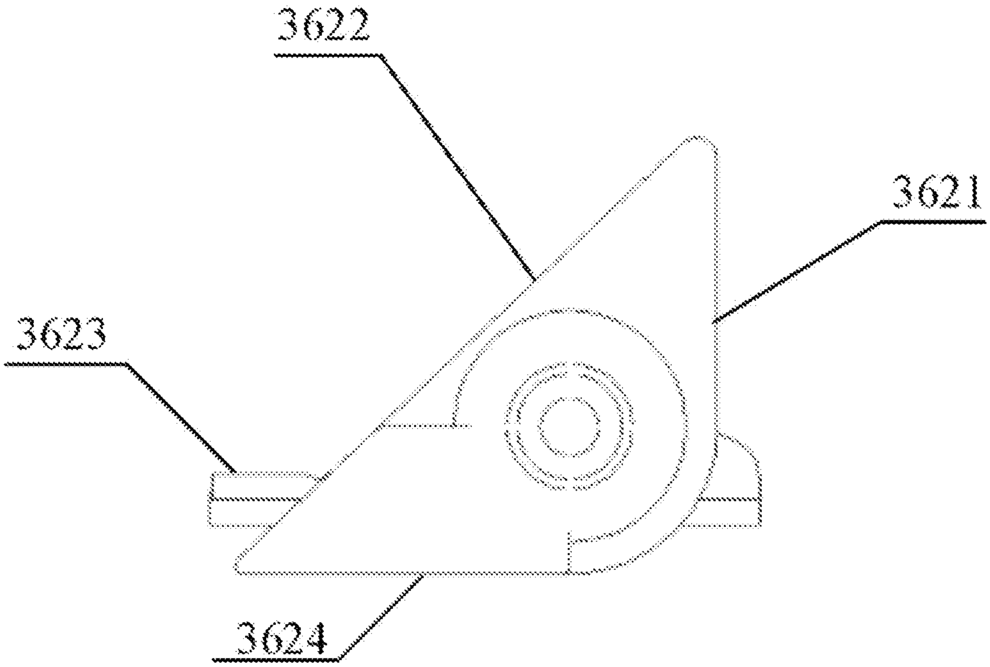
FIG. 9 schematically shows a schematic diagram of a structure of a knob according to an embodiment of the present disclosure.
Figure 10:
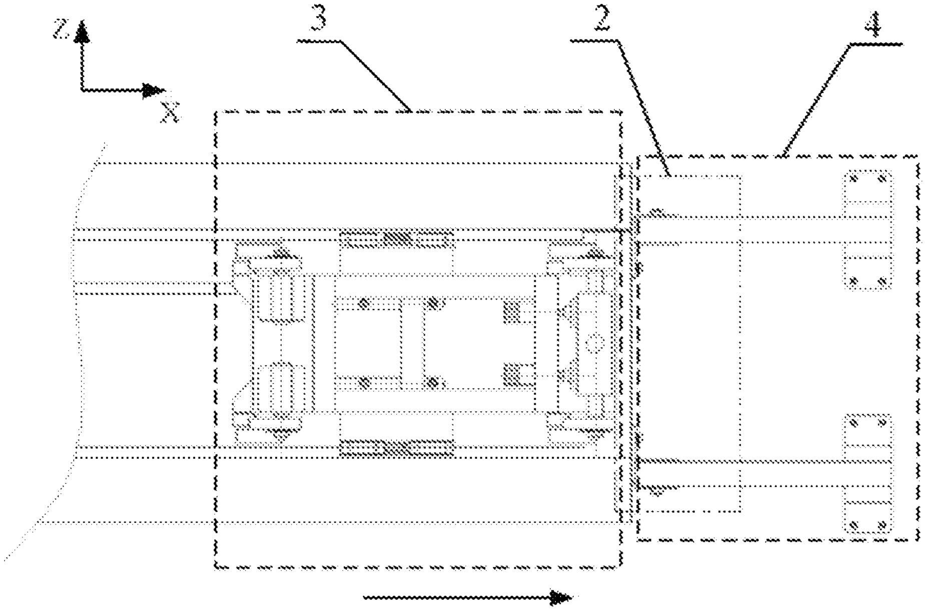
FIG. 10 schematically shows a diagram of a relationship between a first transmission mechanism and a supporting structure according to an embodiment of the present disclosure.

FIG. 1 is a schematic diagram of an entire structure of a conveying system for an inspection device according to an embodiment of the present disclosure. FIG. 2 is a partially enlarged view of FIG. 1, in which schematic diagrams of an imaging system and a supporting structure are shown. FIG. 3 is a top view of a first transmission mechanism included in a conveying system for an inspection device according to an embodiment of the present disclosure. FIG. 4 is a cross-sectional view at an A-A plane shown in FIG. 3. FIG. 5 is a side view of a first transmission mechanism included in a conveying system for an inspection device according to an embodiment of the present disclosure. FIG. 6 is an enlarged view of a sliding mechanism included in a conveying system for an inspection device according to an embodiment of the present disclosure. FIG. 7 schematically shows a top view of a sliding mechanism according to an embodiment of the present disclosure. FIG. 8 schematically shows a cross-sectional view at B-B in FIG. 7. FIG. 9 schematically shows a schematic diagram of a structure of a knob according to an embodiment of the present disclosure. FIG. 10 schematically shows a diagram of a relationship between a first transmission mechanism and a supporting structure according to an embodiment of the present disclosure.

As shown in FIG. 1 to FIG. 10, in the embodiment of the present disclosure, the object to be inspected 2 is transported to a designated position through the first transmission mechanism 3 and the supporting structure 4, and then scanned and inspected by the imaging system 1. Specifically, the first transmission mechanism 3 includes structures such as a driving device 32, a lead screw 33, a sliding mechanism 34, and a first slide rail 35. Through driving the lead screw 33 to rotate by the driving device 32, the lead screw 33 rotates and may drive the sliding mechanism 34 to move. The object to be inspected 2 is placed on the first slide rail 35. When the sliding mechanism 34 is driven by the lead screw 33, the sliding mechanism 34 may push the object to be inspected 2 to move on the first slide rail 35. The end of the first slide rail 35 is connected to the supporting structure 4. One end of the supporting structure 4 cooperates with the end of the first slide rail 35, and the other end of the supporting structure 4 passes through an inspection region of the imaging system 1. Under a driving of the driving device 32, the sliding mechanism 34 may protrude outside from the first slide rail 35, thereby pushing the object to be inspected 2 to slide on the supporting structure 4, and accurately positioning the object to be inspected 2 on the inspection surface 11 of the imaging system 1, improving the positioning accuracy of the conveying system of the inspection device.

It should be noted that the above "designated position" refers to a position where the part to be inspected of the object to be inspected is precisely located in the inspection surface 11 of the imaging system 1 (i.e. a ray main beam surface of the imaging system 1), which facilitates scanning and inspection. The meaning of "designated location" in this article may be understood according to the content here, which will not be further repeated.

It should also be noted that in the embodiment of the present disclosure, the first transmission mechanism 3 and the supporting structure 4 are sequentially arranged along a conveying direction of the object to be inspected 2. In this case, there may be an interval with a certain width between the first transmission mechanism 3 and the supporting structure 4. It should be understood that the interval is allowed to exist as long as the object to be inspected 2 may smoothly pass through the interval in a process of being conveyed from the first transmission mechanism 3 to the supporting structure 4.

In another embodiment of the present disclosure, the first transmission mechanism 3 and the supporting structure 4 may also be an integrated structure, that is, the first transmission mechanism 3 and the supporting structure 4 belong to different sections of a same conveying device. For example, when the above-mentioned "same conveying device" is a conveyor belt, the first transmission mechanism 3 includes the front half of the conveyor belt, and the supporting structure 4 includes the rear half of the conveyor belt. In this case, the object to be inspected 2 may also be accurately positioned on the inspection surface 11 of the imaging system 1. It should be understood that the "conveyor belt" being taken as an example in the embodiment of the present disclosure is only for the convenience of understanding the present scheme, rather than a limitation on the conveying form of the first transmission mechanism 3 and the supporting structure 4.

In the embodiment of the present disclosure, there is also provided with a second slide rail 37. The second slide rail 37 is fixed on the chassis 31. The second slide rail 37 is used to support the sliding mechanism 34. The sliding mechanism 34 is provided with a slide rail groove 38 for matching with the second slide rail 37. The sliding mechanism 34 may slide on the second slide rail 37 through the slide rail groove 38. At the same time, the cooperation between the slide rail groove 38 and the second slide rail 37 plays a supporting role for the sliding mechanism 34, increasing the stability of the sliding mechanism 34 when moving. Moreover, an extension direction of the second slide rail 37 is parallel to an extension direction of the lead screw 33. When the lead screw 33 drives the sliding mechanism 34 to move, the second slide rail 37 may cooperate with the lead screw 33 to guide a movement direction of the sliding mechanism 34, ensuring that the direction in which the sliding mechanism 34 pushes the object to be inspected 2 to move does not deviate. For example, the second slide rail 37 may be a straight guide rail parallel to the extension direction of the lead screw 33.

Optionally, with reference to FIG. 5, in the embodiment of the present disclosure, two first slide rails 35 and two second slide rails 37 are provided, and are respectively disposed on two sides of the sliding mechanism 34. By using multi-point support, the stability of the sliding mechanism 34 and the movement of the object to be inspected 2 may be increased. However, it should be understood that the number of the first slide rails 35 and the second slide rails 37 in the embodiment of the present disclosure is not limited to this, and cases may be included where there are a plurality of first slide rails 35 and/or a plurality of second slide rails 37.

In some exemplary embodiments, the driving device 32 includes a servo motor. The servo motor may convert voltage signals into torque and speed to drive and control the object. The rotor speed of the servo motor is controlled by input signals and the servo motor may react quickly. In an automatic control system, the received electrical signals may be converted into angular displacement or angular velocity output on the motor shaft, and the accuracy of its control position is very accurate. One end of the lead screw 33 is connected to an output terminal of the servo motor, and the other end of the lead screw 33 is connected to the chassis 31 and the lead screw 33 may rotate relative to the chassis 31 with the central axis of the lead screw 33 as the rotating axis.

The forward and reverse rotation of the servo motor may drive the lead screw 33 to drive the sliding mechanism 34 to reciprocally move along the second slide rail 37 in both directions, achieving the conveying of the object to be inspected 2 in batches.

With reference to FIG. 3 and FIG. 4, in the embodiment of the present disclosure, at least one push component 36 is provided on the sliding mechanism 34. When the sliding mechanism 34 moves in the extension direction of the lead screw 33, the push component 36 may move with the sliding mechanism 34, while pushing the object to be inspected 2 to move on the first slide rail 35.

Moreover, a length between a position, at which the sliding mechanism 34 is connected to the lead screw 33, and the push component 36 should not be less than a length of the supporting structure 4, so that when the object to be inspected 2 is conveyed from the first slide rail 35 to the supporting structure 4, one end of the sliding mechanism 34 disposed with the push component 36 may protrude outside from the second slide rail 37, thereby continuing to push the object to be inspected 2 to slide on the supporting structure 4 until the object to be inspected 2 passes through the inspection surface 11 of the imaging system 2 and ultimately comes out from the exit side of the imaging system 2.

In the embodiment of the present disclosure, the push component 36 includes a lever 361 and a knob 362. Specifically, as shown in FIG. 7, a lever 361 is mounted on the sliding mechanism 34, and a knob 362 is rotatably disposed on the lever 361 with a Z-axis as a rotational axis. Under a driving of the sliding mechanism 34, the knob 362 abuts onto the object to be inspected 2 to drive the object to be inspected 2 on the carrying surface to move in an X direction. The carrying surface is used to place the object to be inspected 2. The carrying surface coincides with an upper surface of the first slide rail 35 and is perpendicular to the Z-axis.

It should be noted that in the field of radiation inspection, there is a situation where a size of the inspection region of the object to be inspected is relatively small. For example, in an inspection process of a lithium battery, it is required to inspect the thin film or adhesive layer of the lithium battery, but the thickness of the thin film or adhesive layer of the lithium battery is relatively small. Therefore, for the convenience of description, an axis parallel to the inspection surface 11 of the imaging system 1 is defined as the Z-axis in this article, and the Z-axis is parallel to the upper surface of the first slide rail 35. An axis parallel to the forward direction of the object to be inspected 2 is defined as an X-axis. A Y-axis is defined to be perpendicular to both the X-axis and the Z-axis.

It may be understood that in some embodiments, the number of knobs 362 mounted on the lever 361 may be more than one, so that the knobs 362 may be applicable to apply a push force to the object to be inspected 2 at a plurality of positions.

As mentioned above, in the embodiment of the present disclosure, when the sliding mechanism 34 moves, it has the function of pushing the object to be inspected 2 to move in the X direction through the knob 362. Moreover, after a former object to be inspected 2 is pushed away from an initial position on the first slide rail 35 by the sliding mechanism 34, the next object to be inspected 2 will be placed at the initial position of the former object to be inspected 2 on the first slide rail 35 after a certain time interval. When the sliding mechanism 34 drives the former object to be inspected 2 to move to the next process in the X direction, the driving device 32 may drive the sliding mechanism 34 to move backwards and cause the knob 362 to abut onto the end face of the object to be inspected 2 facing away from a movement direction to push the object to be inspected 2 to move in the X direction. In order to achieve continuous conveying of the object to be inspected 2 by the first transmission mechanism 3, the knob 362 needs to be rotatably disposed on the lever 361 in the embodiment of the present disclosure, and the knob 362 may rotate around an axis direction of the lever 361. The knob 362 is configured as an eccentric structure, where the knob 362 has a first position at which the knob 362 protrudes outside from the carrying surface under the driving of an eccentric force and a second position at which the knob 362 flips below the carrying surface under an action of the external force. When the sliding mechanism 34 moves in the X direction, the knob 362 is used to push the object to be inspected 2 to move in the X direction when the knob 362 is in the first position.

Specifically, as shown in FIG. 8 and FIG. 9, the knob 362 has a push surface 3621, which is applicable to abut the object to be inspected 2; a guide surface 3622 disposed at an angle with the push surface 3621, and applicable to accept the external force. In this embodiment, the knob 362 is in a right angled triangular shape. The push surface 3621 is equivalent to the plane where the right-angle edge is located. The guide surface 3622 is equivalent to the plane where the hypotenuse is located. A limiting structure 3623 is used to limit the rotation of the knob 362 when the knob 362 moves to the first position. When the sliding mechanism 34 moves in the negative direction of the X-axis, the guide surface 3622 collides with the object to be inspected 2 to drive the knob 362 to move to the second position. As shown in FIG. 8 and FIG. 9, the limiting structure 3623 is a limit block disposed at the guide surface 3622 and protruding from the guide surface 3622. According to the mounting method of the knob 362 in FIG. 6, under an action of an eccentric force, the knob 362 is driven to rotate counterclockwise on the lever 361. When the knob 362 rotates to a predetermined position, the limiting structure 3623 is blocked by the limit portion on the sliding mechanism 34 and may not continue to rotate. This position is the first position. In the first position, the knob 362 may not rotate counterclockwise. When the sliding mechanism 34 moves forward in the X direction, the push surface 3621 abuts the object to be inspected 2. The reverse force applied by the object to be inspected 2 does not drive the knob 362 to rotate counterclockwise, and thus the knob 362 may push the object to be inspected 2 to move in the X direction. When the sliding mechanism 34 moves in the negative direction of X, that is, when it moves backwards, the guide surface 3622 will first collide with the rear object to be inspected 2. Under an action of the impact force, the knob 362 will rotate clockwise. During the movement, the knob 362 is gradually pressed down below the carrying surface by the object to be inspected 2. This position is the second position. Until the knob 362 slides over the object to be inspected 2, under the action of the eccentric force, the knob 362 returns to the first position again, and the push surface 3621 is once again located on the end face of the object to be inspected 2 facing away from the movement direction. At this time, the sliding mechanism 34 is driven to move forward in the X direction, and the knob 362 continues to push the object to be inspected 2 to move in the X direction to enter the next process. The above steps are repeated to achieve continuous conveying of the object to be inspected 2.

As shown in FIG. 8, in order to ensure that the center of the knob 362 does not coincide with the rotation center, a counterweight block 3624 is disposed on the knob 362 to adjust the eccentricity of the knob 362. Under an action of the counterweight block 3624, it is possible to automatically reset the knob 362 to the first position, so that the push surface 3621 is parallel to the YZ plane at the first position. The parallel disposing of the push surface 3621 and the YZ plane may ensure that when the push surface 3621 pushes the object to be inspected 2, it will not cause the object to be inspected 2 to dump.

In the embodiment of the present disclosure, a knob 362 is rotatably provided at one end of the sliding mechanism 34 away from the push component 36, and this knob 362 is spaced apart from the knob 362 of the push component 36 in the X direction. For ease of description, the knob 362 close to the imaging system 1 on the sliding mechanism 34 is referred to as a first knob, and the knob 362 away from the imaging system 1 is referred to as a second knob. Through the above design, when the first knob pushes the former object to be inspected 2, the second knob will simultaneously push the next object to be inspected 2. In this way, the next object to be inspected 2 may be synchronously pushed to a position closer to the imaging system 1, saving time for the first knob to return and push the next object to be inspected 2, and improving the conveying efficiency.

Specifically, when the first transmission mechanism 3 starts working, the first object to be inspected 2 is placed at the initial position of the first slide rail 35. In this case, the first object to be inspected 2 is pushed to move by the first knob until the first object to be inspected 2 passes through the inspection surface 11 of the imaging system 1 and finally arrives at the second transmission mechanism 5. In the process of pushing the first object to be inspected 2 by the first knob, the second knob moves synchronously with the first knob and pushes a second object to be inspected 2 from an initial position to a position closer to the imaging system 1. This position is recorded as a middle position. In this way, when the first knob moves back in the negative direction of the X-axis, it only needs to move back to the middle position to be in contact with the second object to be inspected 2 and push the second object to be inspected 2 to move towards the imaging system 1. In the process of pushing the second object to be inspected 2 by the first knob, the second knob may push a third object to be inspected 2 from an initial position to the middle position. From this reciprocating, continuously conveying the object to be inspected may be achieved. By disposing the second knob, it is possible to reduce the distance that the first knob moves back each time the object to be inspected 2 is picked up, thereby improving the transferring efficiency of the object to be inspected 2.

It should be noted that the number of knobs 362 in the embodiment of the present disclosure is only illustrative, rather than the only limitation on the number of knobs 362. Those of skill in the art may dispose any number of knobs 362 in the X direction on the sliding mechanism 34 according to actual needs.

Optionally, the supporting structure 4 includes a beam shaped structure that may be used to carry the sliding of the object to be inspected 2. Two ends of the beam shaped structure are respectively cooperated with and connected to the first transmission mechanism 3 and the second transmission mechanism 4. It should be noted that the rays in radiation imaging are prone to attenuation when passing through metal objects. Therefore, a carbon fiber material is preferred for the supporting structure 4 in the embodiment of the present disclosure.

In the embodiment of the present disclosure, the conveying system for the inspection device may further include a second transmission mechanism 5. The second transmission mechanism 5 is disposed on an exit side of the imaging system 1 and is cooperated with and connected to the supporting structure 4. The second transmission mechanism 5 is used to convey the object to be inspected 2 from the supporting structure 4. After the object to be inspected 2 passes the inspection of the imaging system 1, the object to be inspected 2 is conveyed to the waiting region through the second transmission mechanism 5, and waits for subsequent processing. Besides, by disposing the second transmission mechanism 5, the object to be inspected 2 may be conveyed to a position away from the imaging system 1, thereby avoiding an influence of the radiation when the object to be inspected 2 is taken out.

It should be noted that the connection relationship between the supporting structure 4 and the second transmission mechanism 5 is similar to the connection relationship between the first transmission mechanism 3 and the supporting structure 4. The connection relationship between the first transmission mechanism 3 and the supporting structure 4 has already been detailed in the previous text, which will not be repeated here.

Optionally, in the embodiment of the present disclosure, the conveying method of the second transmission mechanism 5 includes an unpowered conveying. That is, after the object to be inspected 2 is conveyed to the second transmission mechanism 5 by the supporting structure 4, the object to be inspected 2 may slide along the second transmission mechanism 5 under its own gravity, achieving the conveying of the object to be inspected 2. The conveying cost of this unpowered conveying method is relatively low, and it may ensure the normal conveying of the object to be inspected 2.

For example, with reference to FIG. 1, the second transmission mechanism 5 may be an unpowered drum conveyor platform. The unpowered drum conveyor platform is inclined and provided with a plurality of freely rotating drums. After the object to be inspected 2 is conveyed from the supporting structure 4 to the drum conveyor platform, the object to be inspected 2 uses the drum on the drum conveyor platform to slide to the bottom of the drum conveyor platform, completing the conveying process of the object to be inspected 2.

Optionally, in the embodiment of the present disclosure, the conveying method of the second transmission mechanism 5 may also include a power conveying method. The conveying distance of using the power conveying method is longer, the conveying process is more stable, and the conveying efficiency is higher. For example, the conveying method of the second transmission mechanism 5 may be various forms such as a belt conveyer conveying, a power roller conveying, a synchronous belt conveying or a lead screw conveying.

In the embodiment of the present disclosure, the imaging system 1 includes a CT imaging system or a DR imaging system for scanning and inspecting the object to be inspected 2.

Optionally, in some exemplary embodiments, the imaging system 1 is a CT imaging system. The CT imaging system includes structures such as optical machine and an inspector. The CT imaging is the process of scanning a layer with certain thickness of the object to be inspected 2 using an X-ray beam. The inspector receives the X-ray that passes through this layer, the X-ray is converted into visible light, and then converted into an electrical signal by a photoelectric converter, and then the electrical signal is converted into a digital signal by an analog/digital converter. After processing of a computer, the CT image is obtained. The CT imaging has high density resolution and better spatial resolution, resulting in clear images.

Optionally, in some exemplary embodiments, the imaging system 1 includes a DR imaging system. The DR imaging system includes structures such as an electronic cassette, a scanning controller, and an image monitor. The DR imaging is the process of directly converting X-ray photons into a digital image through an electronic cassette, resulting in a DR image. The DR imaging has fast speed, low radiation, higher spatial resolution, and low noise rate.

For example, when using CT imaging system 1 for scanning and inspecting, as the object to be inspected 2 may be transmitted by a servo motor driving the lead screw 33, the conveying position of the object to be inspected 2 may be accurately controlled. That is, it is possible to precisely control the object to be inspected 2 at a designated position on supporting structure 4. At this time, the part to be inspected of the object to be inspected 2 is precisely located on the X-ray main beam surface of the CT imaging system, which facilitates targeted scanning by the CT imaging system and improves inspection accuracy and inspection efficiency.

It should be noted that in the embodiment of the present disclosure, the CT imaging system is only used as an example to explain the scanning and inspecting process of the imaging system 1. However, it should not be understood as a limitation on the imaging method of the imaging system 1.

In the embodiment of the present disclosure, protective covers 6 are provided on both the entrance side and the exit side of the imaging system 1. The protective covers 6 are used to shield the radiation rays of the imaging system 1. Moreover, the protective covers 6 cover outside the first transmission mechanism 3, the supporting structure 4 and the second transmission mechanism 5, which may greatly isolate the radiation of scanning and inspecting rays and has a better radiation protection effect.

Furthermore, in the embodiment of the present disclosure, the protective cover 6 is formed by bending sheet metal, and the outer surface of the protective cover 6 is provided with a lead layer to enhance the radiation shielding effect.

The working principle of the conveying system for the inspection device in the embodiment of the present disclosure is that the first transmission mechanism 3, the supporting structure 4, and the second transmission mechanism 5 are all disposed inside the protective cover 6, which may weaken the radiation of the imaging system 1. In the first transmission mechanism 3, the servo motor drives the lead screw 33 to drive the sliding mechanism 34 to move along the second slide rail 37. A push component 36 is mounted on the sliding mechanism 34. The push component 36 pushes the object to be inspected 2 to move on the first slide rail 35 to the supporting structure 4 and slide along the supporting structure to the inspection surface 11 of the imaging system, and the object to be inspected 2 is inspected by the imaging system 1. After completing the inspection of the object to be inspected 2, the object to be inspected 2 moves out of the protective cover 6 along the second transmission mechanism 5.

It should be noted that the conveying system for the inspection device in the embodiment of the present disclosure is applicable to use in the security inspection field, especially for inspecting certain products that require high image inspection quality. For example, precise positioning of ultra-thin layers such as adhesive layers and thin films of batteries may be performed, so as to obtain high-quality inspection images. It should be understood that the object to be inspected of the conveying system in the embodiment of the present disclosure is not limited to the field of batteries.

The conveying system for the inspection device according to the embodiment of the present disclosure has at least an aspect of the following technical effects.

(1) By the transmission method of using a servo motor to drive the lead screw, the conveying speed and conveying position of the object to be inspected 2 may be precisely controlled, so that the object to be inspected 2 may be accurately located at the ray main beam surface of the imaging system 1, improving the inspection accuracy and the inspection efficiency.

(2) The supporting structure 4 uses carbon fiber profiles to avoid attenuation of radiation in the imaging system when the beams passing through the supporting structure of metal or other materials, which would affect the inspection accuracy.

(3) The exit side of the imaging system 1 is provided with a second transmission mechanism 5. The second transmission mechanism 5 may be either unpowered conveying or powered conveying. The object to be inspected 2 may be conveyed to a position away from the imaging system 1 by the second transmission mechanism 5, which may avoid influence of the radiation when the object to be inspected 2 is taken out.

Although some embodiments of the entire technical concept of the present disclosure have been shown and explained, those of skill in the art will understand that changes may be made to these embodiments without departing from the principles and spirit of the entire technical concept of the present disclosure. The scope of the present disclosure is limited by the claims and their equivalents.

What is claimed is:

1. A conveying system for an inspection device, comprising:

an imaging system configured to scan and inspect an object to be inspected;

a first transmission mechanism disposed on an entrance side of the imaging system, and configured to convey the object to be inspected to the imaging system and make a layer to be inspected of the object to be inspected locate at a ray-beam plane of the imaging system; and a supporting structure intersecting the ray-beam plane of the imaging system, wherein the first transmission mechanism pushes the object to be inspected to slide along the supporting structure and passes through the imaging system, wherein the first transmission mechanism comprises:

a chassis;

a driving device fixed on the chassis;

a lead screw connected to the driving device, and driven by the driving device;

a first slide rail fixed on the chassis, wherein an extension direction of the first slide rail is parallel to an extension direction of the lead screw; and a sliding mechanism connected to the lead screw, wherein the lead screw drives the sliding mechanism to move, so that the sliding mechanism pushes the object to be inspected to slide on the first slide rail and the supporting structure, wherein at least one push component is provided on the sliding mechanism, and the push component moves with the sliding mechanism and is configured to push the object to be inspected to move on the first slide rail, wherein the push component comprises:

a lever disposed on the sliding mechanism; and a knob rotatably disposed on the lever with a Z-axis as a rotating axis, wherein under a driving of the sliding mechanism, the knob abuts onto the object to be inspected to drive the object to be inspected to move, wherein at least one knob is rotatably disposed on the lever and is configured as an eccentric structure, wherein the knob has a first position at which the knob protrudes from a carrying surface under a driving of an eccentric force and a second position at which the knob flips below the carrying surface under an action of an external force, wherein the carrying surface is configured to place the object to be inspected;

when the sliding mechanism moves in an X direction, the knob is configured to push the object to be inspected to move in the X direction with the knob being at the first position, wherein the knob has:

a push surface applicable to abut onto the object to be inspected;

a guide surface disposed at an angle with the push surface, and applicable to accept the external force; and a limiting structure configured to limit a rotation of the knob when the knob moves to the first position, wherein the limiting structure is a limit block disposed at the guide surface and protruding from the guide surface, wherein when the sliding mechanism moves in a negative direction of the X-axis, the guide surface collides with the object to be inspected to drive the knob to move to the second position.

2. The conveying system for the inspection device of claim 1, further comprising: a second slide rail, wherein the second slide rail is fixed on the chassis, the second slide rail is configured to support the sliding mechanism, and the lead screw drives the sliding mechanism to slide on the second slide rail.

3. The conveying system for the inspection device of claim 1, wherein the driving device comprises a servo motor, one end of the lead screw is connected to an output end of the servo motor, and the other end of the lead screw is connected to the chassis.

4. The conveying system for the inspection device of claim 1, further comprising:

a counterweight block disposed on the knob to adjust an eccentricity of the knob, so that the knob automatically resets to the first position, and the push surface is perpendicular to a YZ plane at the first position.

5. The conveying system for the inspection device of claim 1, wherein a knob is rotatably disposed at one end of the sliding mechanism away from the push component, and the knob away from the push component is spaced apart from the knob of the push component in the X direction.

6. The conveying system for the inspection device of claim 1, further comprising a second transmission mechanism, wherein the second transmission mechanism is disposed on an exit side of the imaging system, and the second transmission mechanism is configured to convey the object to be inspected from the supporting structure.

7. The conveying system for the inspection device of claim 6, wherein the second transmission mechanism comprises an unpowered conveying device.

8. The conveying system for the inspection device of claim 6, wherein the second transmission mechanism comprises a belt conveyer, a power roller, a synchronous belt or a lead screw.

9. The conveying system for the inspection device of claim 1, wherein the imaging system comprises a CT imaging system or a DR imaging system.

10. The conveying system for the inspection device of claim 1, wherein protective covers are provided on both the entrance side and the exit side of the imaging system, and the protective covers are configured to shield a radiation ray of the imaging system.

11. A conveying system for an inspection device, comprising:

an imaging system configured to scan and inspect an object to be inspected;

a first transmission mechanism disposed on an entrance side of the imaging system, and configured to convey the object to be inspected to the imaging system and make a layer to be inspected of the object to be inspected locate at a ray-beam plane of the imaging system; and a supporting structure intersecting the ray-beam plane of the imaging system, wherein the first transmission mechanism pushes the object to be inspected to slide along the supporting structure and passes through the imaging system;

wherein the first transmission mechanism comprises:

a chassis;

a driving device fixed on the chassis;

a synchronous belt driven by the driving device;

a first slide rail fixed on the chassis, wherein the first slide rail is configured to support the object to be inspected and convey the object to be inspected to the supporting structure; and a sliding mechanism, wherein the synchronous belt drives the sliding mechanism to move, so that the sliding mechanism pushes the object to be inspected to slide on the first slide rail and the supporting structure, wherein at least one push component is provided on the sliding mechanism, and the push component moves with the sliding mechanism and is configured to push the object to be inspected to move on the first slide rail, wherein the push component comprises:

a lever disposed on the sliding mechanism; and a knob rotatably disposed on the lever with a Z-axis as a rotating axis, wherein under a driving of the sliding mechanism, the knob abuts onto the object to be inspected to drive the object to be inspected to move, wherein at least one knob is rotatably disposed on the lever and is configured as an eccentric structure, wherein the knob has a first position at which the knob protrudes from a carrying surface under a driving of an eccentric force and a second position at which the knob flips below the carrying surface under an action of an external force, wherein the carrying surface is configured to place the object to be inspected;

when the sliding mechanism moves in an X direction, the knob is configured to push the object to be inspected to move in the X direction with the knob being at the first position, wherein the knob has:

a push surface applicable to abut onto the object to be inspected;

a guide surface disposed at an angle with the push surface, and applicable to accept the external force; and a limiting structure configured to limit a rotation of the knob when the knob moves to the first position, wherein the limiting structure is a limit block disposed at the guide surface and protruding from the guide surface, wherein when the sliding mechanism moves in a negative direction of the X-axis, the guide surface collides with the object to be inspected to drive the knob to move to the second position.

* * * * *